(12) United States Patent
Bylsma

(10) Patent No.: US 7,856,205 B2
(45) Date of Patent: Dec. 21, 2010

(54) CONVERSION FROM NOTE-BASED AUDIO FORMAT TO PCM-BASED AUDIO FORMAT

(75) Inventor: Rodney Bylsma, Ottawa (CA)

(73) Assignee: Research in Motion Limited, Waterloo (CA)

( * ) Notice: Subject to any disclaimer, the term of this patent is extended or adjusted under 35 U.S.C. 154(b) by 211 days.

(21) Appl. No.: 12/270,182

(22) Filed: Nov. 13, 2008

(65) Prior Publication Data

US 2009/0082069 A1   Mar. 26, 2009

Related U.S. Application Data

(63) Continuation of application No. 11/280,200, filed on Nov. 17, 2005, now Pat. No. 7,467,982.

(51) Int. Cl.
*H04Q 7/20*   (2006.01)
(52) U.S. Cl. .................. 455/23; 455/39; 455/550.1; 455/567; 455/412.1; 455/412.2
(58) Field of Classification Search .................. 455/23, 455/39, 550.1, 567, 412.1, 412.2, 20, 22, 455/500, 517; 375/242
See application file for complete search history.

(56) References Cited

U.S. PATENT DOCUMENTS 4,189,715 A   2/1980   Duttweiler

| 6,586,667 B2 | 7/2003 | Morita | |
| 2001/0039873 A1* | 11/2001 | Yi et al. | 84/610 |
| 2004/0060424 A1 | 4/2004 | Klefenz et al. | |
| 2004/0186707 A1 | 9/2004 | Fourquin et al. | |
| 2006/0277579 A1* | 12/2006 | Inkinen | 725/73 |

OTHER PUBLICATIONS

Ringtone Creator as found at http://www.ringtonecreator.info/doc-gui/01-intro.html.
comp.graphics.algorithms—sine/cosine look up tables Options as found at http://groups.google.ca/group/comp.graphics.algorithms/browse_thread/thread/7067e0b7d7c04c16/f246ed656fbab5d0?g=sine+lookup+table+fpu&mum=1&hl=en#f246ed656fbab5d0sinelookuptablefpu.

* cited by examiner

*Primary Examiner*—Keith T Ferguson
(74) *Attorney, Agent, or Firm*—Ridout & Maybee LLP

(57) ABSTRACT

A system and method for converting a polyphonic note-based audio object to a Pulse Code Modulated (PCM) audio format is disclosed. An electronic communication device includes a memory containing a polyphonic note-based audio object containing at least two notes which overlap in at least some time interval and a lookup table containing trigonometric function evaluations. The polyphonic note-based audio object contains note frequency information. The polyphonic note-based audio object is converted to a PCM stream by generating PCM code words for each sample point in the PCM stream based upon the polyphonic note frequency information. The PCM code words are determined based upon selection of one or more of the trigonometric function evaluations within the look-up table. A speaker outputs audio based upon the PCM formatted stream.

13 Claims, 3 Drawing Sheets

CONVERSION FROM NOTE-BASED AUDIO FORMAT TO PCM-BASED AUDIO FORMAT

CROSS-REFERENCES TO RELATED APPLICATIONS

This application is a continuation of U.S. patent application Ser. No. 11/280,200 filed Nov. 17, 2005, the complete disclosures of which are herein incorporated by reference.

FIELD

The present application relates to audio object processing and, in particular, to conversion from a note-based audio format to a Pulse Code Modulation (PCM)-based audio format.

BACKGROUND

Audio objects such as music files can come in a variety of different formats. Sometimes an electronic communication device requires an audio object to be in a particular format in order to use it to generate musical sounds. For example, certain cellular phones might not be able to play an audio file, in order to provide notification of an incoming call, unless that audio file is in a PCM-based format. If the audio file is instead in a note-based format, the cellular phone might be programmed to convert the audio file from its note-based format to the required PCM-based format by carrying out a relatively large number of floating point mathematical calculations. These floating point mathematical calculations could result in a noticeable delay in the conversion process if the electronic communication device does not have a floating point unit (FPU).

Accordingly, it would be advantageous to improve systems and methods for converting from a note-based audio format to a PCM-based audio format.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The following description of example embodiments does not limit implementation to any particular electronic communication device architecture. Also, it will be understood that "electronic communication device" as used herein is not limited to those devices that are, for example, wirelessly enabled or, for example, mobile. The term "object" as used herein means a passive entity that contains or receives information, unless another meaning is clear from the context in which the term is used.

In one aspect, the present application provides an electronic communication device. The electronic communication device includes a memory containing a note-based audio object and a lookup table containing trigonometric function evaluations. The note-based audio object contains note frequency information. The device also includes a conversion module for converting the note-based audio object to a Pulse Code Modulated (PCM) stream having a plurality of sample points, a processor for reading said memory and executing said conversion module, and a speaker, including a speaker driver, for receiving the PCM stream and outputting corresponding audio. The conversion module includes computer executable instructions for generating a PCM value for each sample point based upon the note frequency and the trigonometric function evaluations.

In another aspect, the present application provides a method of converting a note-based audio object to a (Pulse Code Modulated) PCM stream by an electronic communication device. The electronic communication device has a memory storing a lookup table of trigonometric function evaluations. The memory also stores the note-based audio object, which includes note frequency information. The PCM stream has a plurality of sample points. The method includes steps of accessing the note-based audio object to extract the note frequency information and generating a PCM value for each sample point based upon the note frequency information and the trigonometric function evaluations.

Figure 1:
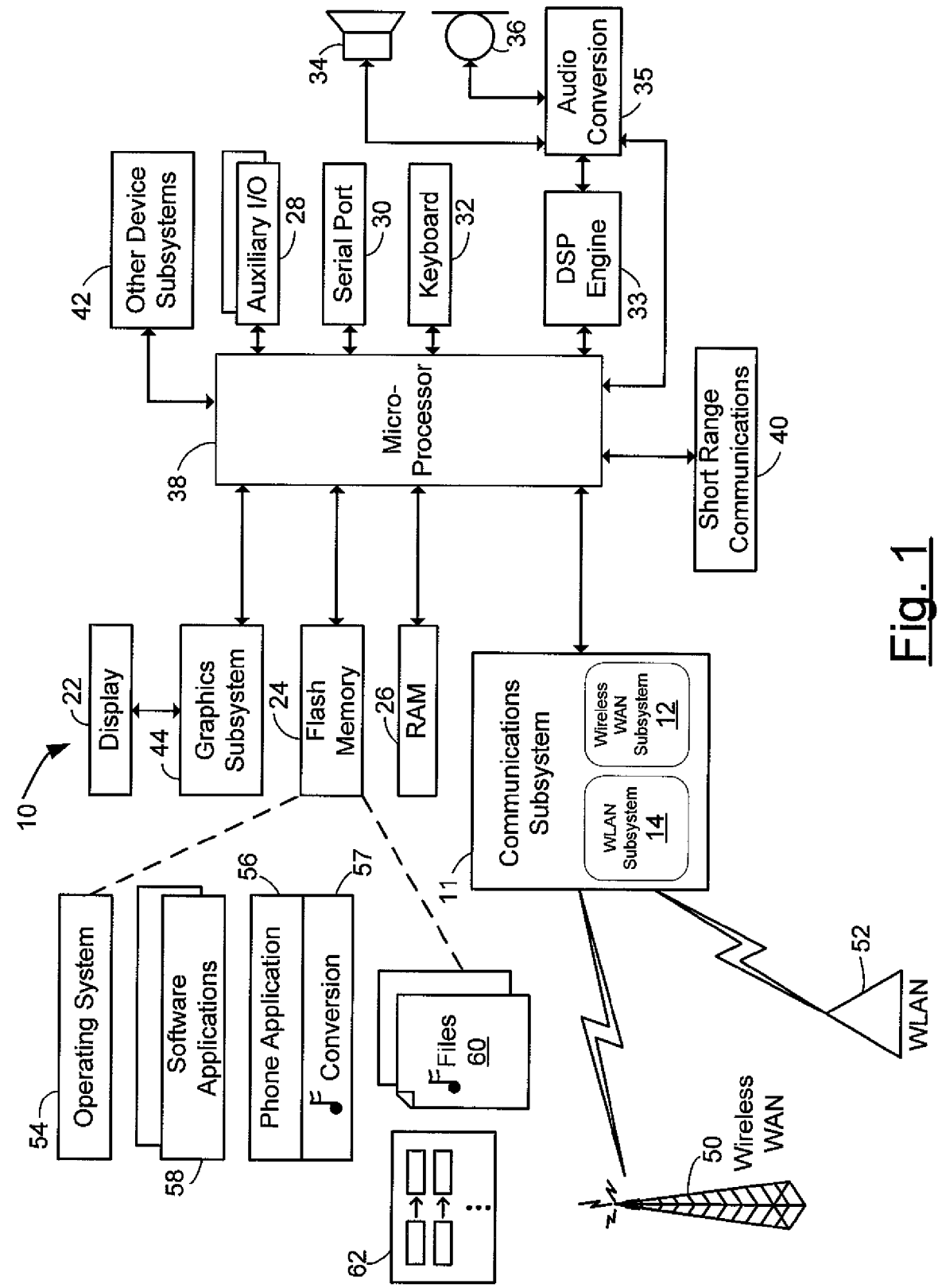
FIG. 1 shows a block diagram of an electronic communication device.

Referring now to the drawings, FIG. 1 shows a block diagram of an electronic communication device 10. In at least one example, the electronic communication device 10 is a two-way mobile communication device having data and possibly also voice communication capabilities. In an example embodiment, the device 10 has the capability to communicate with other devices and computer systems on the Internet. Depending on the functionality provided by the device 10, in various embodiments the device may be a data communications device, a multiple-mode communications device configured for both data and voice communication, a mobile telephone, or a Personal Digital Assistant (PDA), among other things.

In the illustrated embodiment, the device 10 includes a wireless communications subsystem 11 for exchanging messages with one or more communications networks 50, 52. In one example embodiment, the subsystem 11 includes a wireless wide area network (WAN) communications subsystem 12 for communicating with a cellular (wireless) WAN 50 and a wireless local area network (WLAN) communications subsystem 14 for communicating with WLAN 52. In some examples, the communications subsystems 12, 14 may each include a receiver, a transmitter, and associated components such as one or more, preferably embedded or internal, antenna elements, and a processing module such as a digital signal processor (DSP). As will be apparent to those skilled in the field of communications, the particular design of the communications subsystem 11 will be dependent in part upon the communication network(s) in which the device 10 is intended to operate. For example, if the device is not intended to communicate over a WLAN, then the device might not include the WLAN subsystem 14.

The device 10 includes a microprocessor 38 that controls the overall operation of the device. The microprocessor 38 interacts with the communications subsystem 11 and also interacts with further device subsystems/circuitry such as a graphics subsystem 44, flash memory 24, random access memory (RAM) 26, auxiliary input/output (I/O) subsystems (and/or devices) 28, serial port 30, keyboard or keypad 32, DSP engine 33, audio conversion component 35, a short-range communications subsystem 40, and any other device subsystems generally designated as 42. The graphics subsystem 44 interacts with a display 22 and renders graphics and/or text upon the display 22.

The audio conversion component 35 is, in some example embodiments, one or more analog-to-digital and digital-to-analog conversion chips. When a user of the device 10 speaks into the microphone 36, the audio conversion component 35 converts an analog signal created by the microphone 36 from the user's voice, into digital signals. These digital signals are compressed by the DSP engine 33. The DSP engine 33 also removes any background noise. In some electronic communication devices, instead of the DSP engine 33 and one or more separate conversion chips, there is a single component frequently referred to as a codec. Some high end consumer electronics include a codec having very extensive conversion capabilities.

In addition to the device 10 having the capability for a device user to input audible sounds through the microphone 36, so too is the emission of audible sounds possible. In particular, the speaker 34 is an electro-acoustic transducer that translates received electrical impulses into audible sounds. In order for the illustrated speaker 34 to emit intended audible sounds, it needs to receive an appropriate analog signal from the audio conversion component 35 which, in addition to being able to convert an analog signal into digital signals, can also convert digital signals back into an analog signal. If the audio conversion component 35 includes a stereo digital-to-analog converter, then the device 10 may be able to play audio objects of an MP3 or greater quality.

Operating system software 54 and various software applications 58 used by the microprocessor 38 are, in some example embodiments, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, can enable execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless networks 50, 52, the auxiliary I/O subsystem 28, serial port 30, short-range communications subsystem 40 or any other suitable subsystem, and installed by a user in the RAM 26 or a non-volatile store for execution by the microprocessor 38. Such flexibility in application installation increases the functionality of the device and may provide enhanced on-device functions, communication-related functions, or both.

The serial port 30, which may be a universal serial bus (USB) port, would normally be implemented in a personal digital assistant (PDA)-type communications device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communications network.

The short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

The WLAN 52 includes, in some examples, a number of wireless access points, and operates in conformance with one or more IEEE 802.11 protocols. In some examples, the WLAN 52 is part of a corporate (or other organization) network.

The wireless WAN 50 is, in an example embodiment, a wireless packet data network, (e.g. Mobitex™ or DataTAC™), which provides radio coverage to electronic communication devices 10. Wireless WAN 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). With respect to the illustrated device 10, incoming phone communications would normally be received from the wireless WAN 50 rather than, for example, the WLAN 52. It is possible however that communications somewhat analogous to phone communications could be received from the WLAN 52, and examples of such communications are known to those skilled in the art.

The device 10 may be a handheld device; however at least some embodiments of the invention are not restricted to handheld devices. For example, a non-portable, fixed telephone could include one or more example embodiments of the invention. Also, phone communications in the context of embodiments of the invention are not restricted to those carried out over wireless networks. For example, at least some embodiments of the invention are directed towards fixed telephones that can communicate with other fixed telephones over networks such as the Public Switched Telephone Network (PSTN).

If the electronic communication device 10 is a cellular phone, a phone communication would normally be received at the device 10 in the form of WAN communication signals, but as another example, if the electronic communication device 10 is a non-portable, fixed telephone, the phone communication would normally received at the device 10 in the form of electrical signals traveling through a wire. As yet another example, if the electronic communication device 10 comprised the handset of a portable telephone, phone communications would normally be delivered to the handset by way of short-range radio signals.

In at least one embodiment, the software resident on the device 10 includes at least one phone application 56. Phone functionality provided to the user of the device 10 is implemented in part through the phone application 56. For example, the phone application 56 can permit the user to save and use speed dial numbers, record and view call logs, set call forwarding and voice mail options, select ringtones for incoming phone calls and other phone features.

The illustrated phone application 56 includes an audio object conversion module 57 for carrying out format conversion in accordance with example embodiments of the invention. It will be understood that computer executable instructions of the conversion module 57 are also the computer executable instructions of the phone application 56 because of the fact that the conversion module 57 is a "module" of the phone application 56. Thus, it is convenient for the purposes of the present discussion to refer to the application 56 rather than the module 57. Those skilled in the art will appreciate that it may be an arbitrary decision to put certain code in one module rather than another.

Although the phone application 56 is shown as a stand-alone application in the example embodiment shown in FIG. 1, it will be appreciated that the phone application 56 may be implemented as a module or component of another application program or it may be implemented as a module or component of the operating system 54. It will also be appreciated that modules explicitly or implicitly described as being modules of the phone application 56 might alternatively be modules or components of another application program (or the operating system 54). Any references herein to the phone "application" are intended to include applications, modules, subroutines, and any other software-based implementations that may be used to give effect to the functions described herein. The suitable programming of such software-based modules will be understood by those of ordinary skill in the art having regard to the description herein.

For the illustrated device 10, incoming phone communications would normally be received from the wireless WAN 50 and initially processed by the communications subsystem 11. Following the communications subsystem 11 providing indication to the microprocessor 38 that there is an incoming call, the phone application 56 causes the user of the device 10 to be notified of this incoming call. In some examples, the phone application 56 does this by "playing" music, meaning the phone application 56 attempts to read a stored audio object (for example, a ringtone file) in order that digital signals containing the music data of the audio object can be generated and sent by the microprocessor 38 to the audio conversion component 35 (or to the DSP engine 33 if any DSP-related processing, such as decoding, is necessary). The generated digital signals can be translated by the audio conversion component 35 into an analog music signal consisting of electrical impulses. These electrical impulses are sent to the speaker 34. The speaker 34 translates the received electrical impulses into audible sounds so as to alert the user of the device to the incoming call.

One or more audio objects 60 are stored in the flash memory 24. The phone application 56 may designate one or more of these audio objects 60 and/or one or more portions of these audio objects 60 to be played when there is any incoming call, a particular type of incoming call (e.g. a call where the calling party has blocked call identification) and/or a call coming from a phone having a particular phone number that is familiar to the user. If the designated music object 60 contains the music data for an entire song, it will be understood that perhaps only a portion of the designated music object 60 will be played by the phone application 56. This is because of the likely possibility that after a preset period of time, for example after 20 to 30 seconds, the call might receive alternative handling. For example, the call might be forwarded to voice mail. As the music tracks of mainstream music artists are commonly several minutes in length, it might not be necessary or desirable to play an entire music file.

For PCM-based audio objects (for example, files, streams), the format is such that sounds are represented as digitally encoded sound waves. Examples of PCM-based formats include Wave, AU (or .au) format sound, and many others.

Figure 2A:
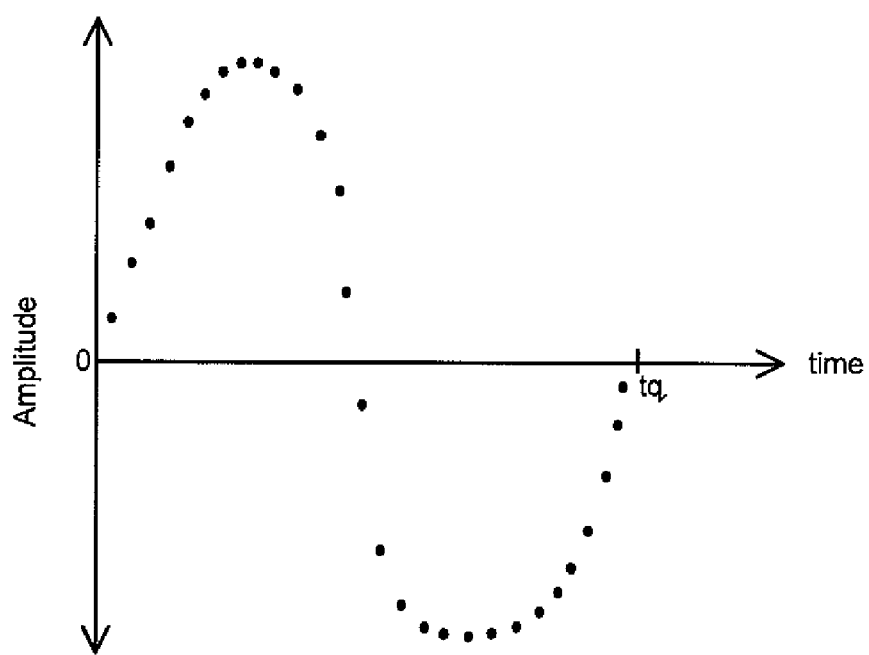
FIG. 2A is a graph diagrammatically depicting sound data for an example PCM-based audio object.

FIG. 2A graphically depicts sound data for an example PCM-based audio object between the time interval of $t=0$ and $t=t_q$. The example PCM-based audio object depicted in the graph comprises a series of binary code words wherein each word represents an instantaneous value (point on the graph) of a periodically sampled and quantized analog signal. It will be noted that the depicted sound data possibly corresponds to a single musical note being played during the illustrated time interval, because the true analog signal for the interval portion appears to be a single sine wave rather than a sum of sine waves. When a ringtone is such that only a single note is played at any one moment in time during the playing of that ringtone, the ringtone may be described as being a monotonic ringtone.

Figure 2B:
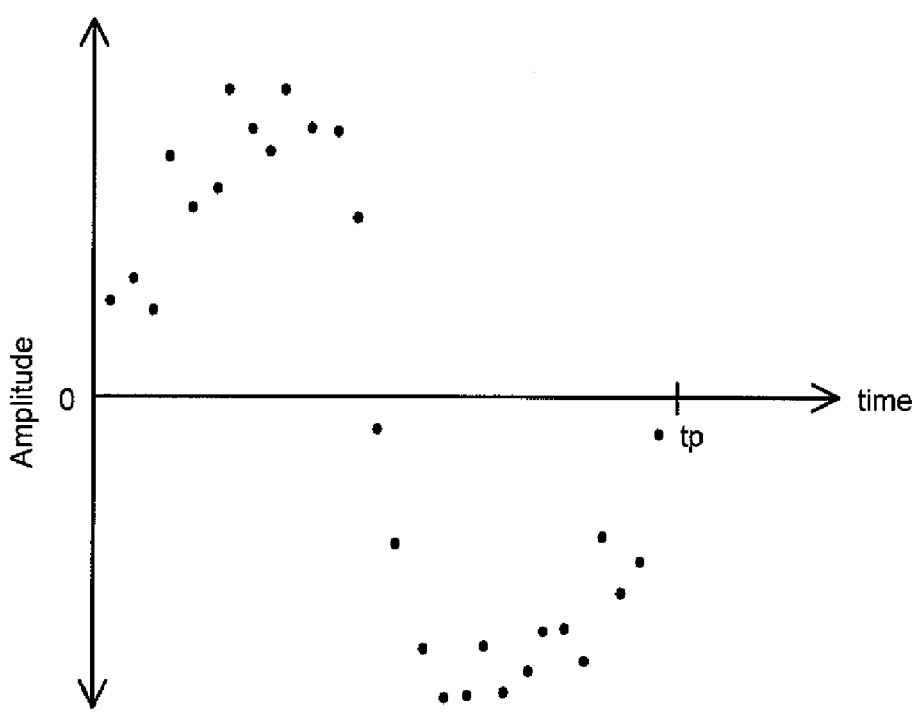
FIG. 2B is another graph diagrammatically depicting sound data for another example PCM-based audio object.

FIG. 2B graphically depicts sound data for another example PCM-based audio object between the time interval of $t=0$ and $t=t_p$. The depicted sound data may correspond to multiple musical notes being played simultaneously during the illustrated time interval, because the true analog signal for the interval portion appears to be a sum of sine waves. According to Fourier's analysis, any infinite signal can be decomposed into an infinite sum of sinusoids, though more importantly from a practical standpoint, those skilled in the art will appreciate that many signals can quite adequately be approximated as a finite sum of sinusoids. When a ringtone is such that multiple notes (and/or multiple synthesized musical instruments) are played simultaneously at any one moment in time during the playing of that ringtone, the ringtone may be described as being a polyphonic ringtone.

As contrasted to the PCM-based audio object, the music data contained in the note-based audio object typically comprises an array of notes and durations. A very common example of a note-based audio-object is a Musical Instrument Digital Interface (MIDI) file. A MIDI file includes a note-based description such that the start and end of a tone and/or the start of the tone and the duration of the tone are recorded as a function of time. Other examples of formats for note-based audio objects (some being less complex and others being more complex than MIDI) include Scalable Polyphony (SP) MIDI, General MIDI (GM), Ring Tone Test Transfer Language (RTTTL) and various proprietary note-based formats.

A note-based audio object may be converted into a PCM-based audio object such as, for example, a PCM-based stream. The generic musical notes founding in a note-based audio object may also be described in terms of sinusoidal audio signals of a certain frequency. The higher the note, the higher the frequency of the associated audio signal (and vice versa).

In the example embodiment illustrated in FIG. 1, the electronic device 10 is not capable of playing an audio object unless it is in PCM-based format. Accordingly, if the desired ringtone is found in one of the objects 60 that has been stored in the flash memory 24 in a note-based rather than PCM-based format, the note-based object will need to be converted into a PCM-based object (typically a PCM-based stream) in order for it to be played by the phone application 56. In one example embodiment, the microprocessor 38 performs the function of converting the note-based format audio object to a PCM-based object by calculating the appropriate code word for each sample point within the PCM-base object based on the note data. However this conversion process involves a large number of mathematical (and other) operations with floating point numbers, in particular sine and cosine calculations. In some embodiments, the device 10 may include a floating point unit (FPU), which is a device normally employed for the purpose of carrying out operations with floating point numbers, in order to carry out the conversion without a noticeable delay being incurred. However in many embodiments, the device 10 does not include an FPU and there are no DSP components practically accessible to carry out the needed mathematical calculations. Therefore, the microprocessor 38 may need to carry out the floating point mathematical calculations in software, which may result in a significant delay of one or more seconds before the application 56 is able to play the PCM formatted stream.

In some embodiments according to the present application, the conversion of a note-based audio object to a PCM-based audio object is carried out through a method that minimizes the number of operations with floating point numbers. In particular, the conversion may be carried out with the use of a look-up table 62 (FIG. 1) stored within flash memory 24 (FIG. 1). The look-up table 62 may store a set of trigonometric function evaluations, such that when a trigonometric operation needs to be performed in the conversion process, the look-up table is used instead of performing the actual trigonometric operation.

Figure 3:
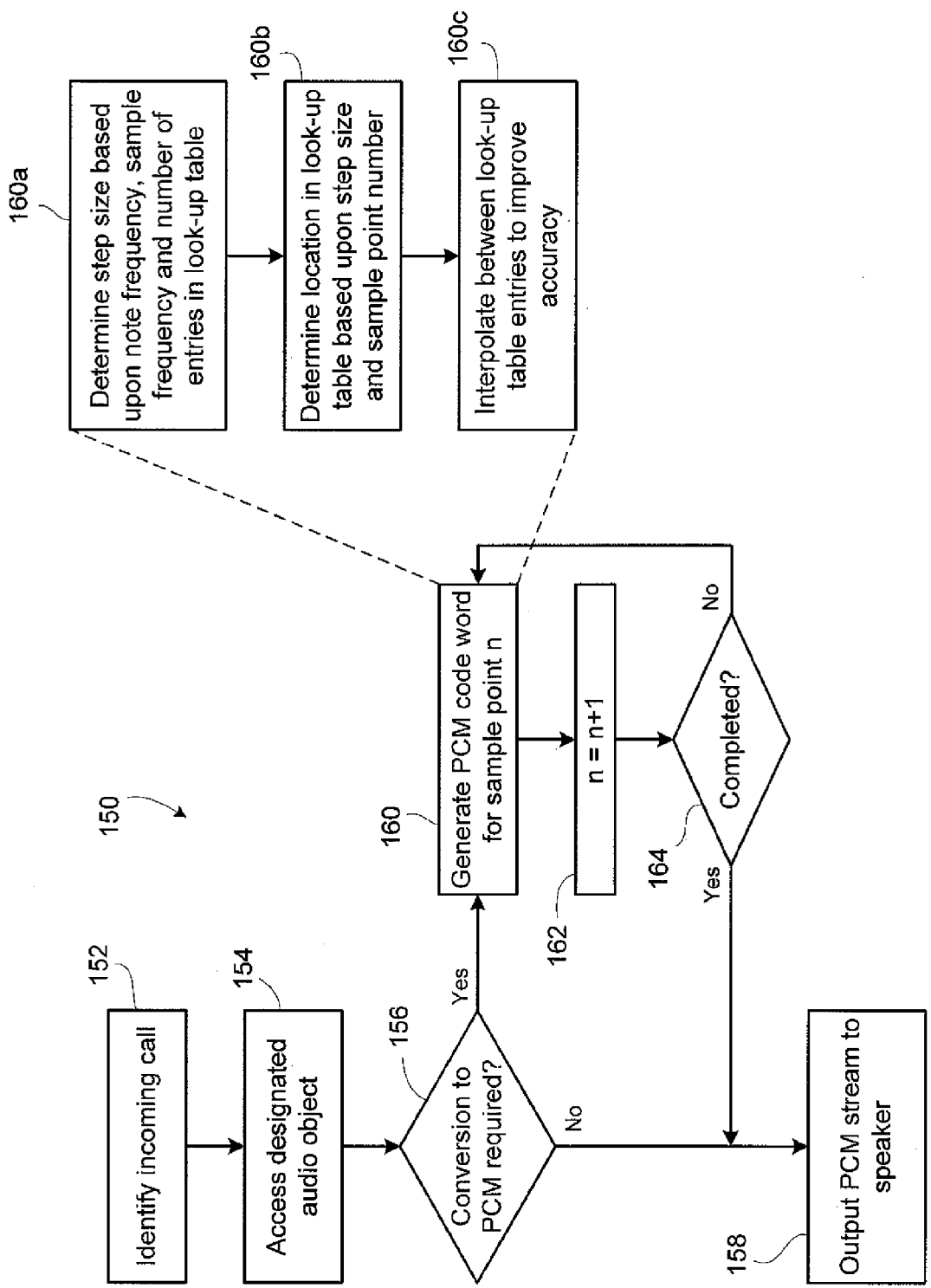
FIG. 3 shows, in flow chart form, a method of generating a ringtone using conversion from a note-based audio format to a PCM-based audio format.

FIG. 3 illustrates a ringtone generation method 150 in accordance with at least one embodiment of the present application. The method 150 begins at step 152 with the recognition of an incoming call. As previously explained, the phone application 56 may identify an incoming call on the basis of a message or indicator provided by the communications subsystem 11. By receiving this indication, the phone application 56, in some examples, is actuated to take the necessary steps to permit playing of the audio object.

In step 154, the phone application 56 may access the designated audio object. As explained above, the particular audio object designated for alerting the user to an incoming call may be a default ringtone, or it may be specific to the caller identity, or otherwise configurable by the user. Step 154 may include reading the object or otherwise determining it format-type.

In step 156, the phone application 56 determines whether it is necessary to convert the audio object into PCM format. If not, then the method 150 proceeds to step 158 wherein the PCM-format audio object is output to the speaker. It will be understood that the phone application 56 may output a PCM-format stream from the audio object to the audio conversion component 35, which will generate the analog signal to drive the speaker and produce the audible ringtone.

If the phone application 56 recognizes that conversion is required, i.e. that the audio object is in a note-based format, then from step 156 the method 150 proceeds to step 160. In step 160, the conversion process is initiated. In particular, in steps 160, 162, and 164, a PCM stream is constructed based upon the note information contained in the note-based format audio object. In step 160, note-based data is extracted from the note-based audio object in and a PCM code word is generated for a first sample point (n=1). In step 162, the sample point number, n, is incremented. In step 164, if the conversion is complete, i.e. if no further PCM code words need be generated to convert the note-based audio object to a PCM-based stream, then the method 150 continues at step 158 wherein the PCM-based stream is output to the speaker. Otherwise, the method 150 loops back to step 160 to generate the next PCM code word.

Step 160 involves the generation of a PCM code word based upon the note (i.e. frequency) data and duration or timing information contained in the note-based audio object. This conversion may require trigonometric operations for determining the PCM sample value (code word) at various sample points of a given note frequency. Accordingly, in accordance with the present application, step 160 includes utilization of the look-up table 62 (FIG. 1) containing trigonometric function evaluations whenever a trigonometric operation is required in the conversion process.

In at least one embodiment, step 160 may include steps 160a, 160b, and 160c. In step 160a, a step size is determined based upon the note frequency, the sampling frequency, and the number of entries in the look-up table 62. The step size represents a 'distance' within the look-up table 62 traversed in each sample point increment when mapping a particular note frequency to PCM values. The sampling frequency may be configurable by a user or device manufacturer, but may be considered preset for the purposes of the method 150.

In step 160b, the step size and sample point number (n) are used to identify an entry in the look-up table. The entry identifies a PCM code word. In step 160c, interpolation may be applied to pinpoint a PCM value falling between the entry identified in step 160b and the next entry in the look-up table 62.

It will be appreciated that the interpolation of step 160c is not essential to obtain the trigonometric function values required by the instructions. For example, where the function evaluations table in the particular circumstance has a sufficiently large number of entries to avoid the need for interpolation, individual trigonometric function values required by the instructions can equal individual table entries.

The use of the look-up table to obtain trigonometric function evaluations prevents the need to carry out floating point mathematical calculations In some implementations, scaling and descaling operations may be applied within steps 160a, 160b, or 160c to facilitate easier manipulation and/or accuracy. In at least one embodiment, the scaling and descaling operations are implemented by way of bit-shift operations, so as to ease the computational burden.

An example conversion is now described. The conversion is based upon a look-up table having a number of entries M. A scaling factor Y and a descaling factor X are chosen such that Y/X=M. The example is based upon a sampling frequency $f_s$. The sample point number, n, ranges from 0 to the maximum, which is determined from the sampling frequency $f_s$ and the duration of the audio.

The note-based file provides a note frequency $f_n$. The step size within the look-up table is directly related to the ratio between the note frequency $f_n$ and the sampling frequency $f_s$. This ratio, multiplied by the sample point number, n, will lead to a location within the look-up table. It will be appreciated that the look-up table may be based upon a single cycle of a sinusoid; accordingly, as the "location" calculation begins to result in placements outside of the table then there is a "wrap-around" to the beginning of the look-up table. This operation may be performed by subtracting the location result by the number of entries in the table if the location result exceeds the number of entries in the table. Other mechanisms for implementing the wrap-around will be appreciated.

In order to improve accuracy, the location calculation is scaled by the scaling factor Y so as to produce a scaled location value that has a numerator K and a remainder R. The relationship may be expressed as:

$$\text{Scaled location} = (Y*n*f_n)/f_s = K+R$$

The numerator K is used to pinpoint the selected entry within the look-up table for the given sample point number n. The remainder R is later used to interpolate between the selected entry and the next entry in the look-up table.

To determine the location in the table, the numerator K is then descaled by the decaling factor X. The result provides an entry within the look-up table (subject to dealing with wrap-around, as discussed above).

Once the selected entry is identified, then the remainder R is used to interpolate between the selected entry and the next entry in the table. In particular, the PCM code word value of the selected entry is subtracted from the PCM code word value of the next entry and the difference is multiplied by the remainder R. The resulting product is then added to the PCM code word value for the selected entry and this provides the PCM code word for sample point number n.

In at least one example embodiment, the look-up table includes 32 signed entries ranging from −32767 to 32767. This range may be suitable for 16 bit, signed code words. The sampling frequency $f_s$ in this example may be preset to 24 kHz. A PCM code word is produced for each sampling point. Accordingly, in a one second interval the number of code words that would need to be generated would be 24,000.

In this example, the scaling factor Y may be 131,072 and the descaling factor X may be 4096. It will be noted that ratio of the scaling factor Y to the descaling factor X is 32, which is the number of entries in the look-up table. Here the selected scaling factor of 131,072 is selected on the basis that it may be implemented by way of a bit-wise left-shift operation (by 17 bits) and the descaling may be implemented by way of a bit-wise right-shift operation (by 12 bits), allowing the operation to be performed using shift registers. As will be appreciated by those skilled in the art, bit-wise shifting is a convenient way to implement multiplication or division by factors of 2. In the present described example embodiment, the factor of 131,072 is selected on the basis that it provides the largest scaling factor implementable within a 32-bit register having regard to the maximum expected note frequency $f_n$.

It will also be appreciated that if the value of descaled K is greater than 32, then this value may be divided by the number of table entries, e.g. 32. It will also be appreciated that the division by 32 may be implemented by right-shifting the value by 5-bits.

To further facilitate understanding, the following is an example of the above-described manipulations carried out with n=10 ($10^{th}$ sampling point), note frequency $f_n$=262 Hz (middle C), and sampling frequency $f_s$=24,000 Hz. The 32 entry look-up table is as follows:

| | |
|---|---|
| 1. | 0 |
| 2. | 6393 |
| 3. | 12539 |
| 4. | 18204 |
| 5. | 23170 |
| 6. | 27245 |
| 7. | 30273 |
| 8. | 32137 |
| 9. | 32767 |
| 10. | 32137 |
| 11. | 30273 |
| 12. | 27245 |
| 13. | 23170 |
| 14. | 18204 |
| 15. | 12539 |
| 16. | 6393 |
| 17. | −0 |
| 18. | −6393 |
| 19. | −12539 |
| 20. | −18204 |
| 21. | −23170 |
| 22. | −27245 |
| 23. | −30273 |
| 24. | −32137 |
| 25. | −32767 |
| 26. | −32137 |
| 27. | −30273 |
| 28. | −27245 |
| 29. | −23170 |
| 30. | −18204 |
| 31. | −12539 |
| 32. | −6393 |

In this case, K is the whole number portion of (131,072*10*262)/24,000 or 14,308. R is the remainder portion of (131,072*10*262)/24,000 or 16,640/24,000. When K is divided by 4096, the result is 3, so entry number 3 is the selected table entry, which shows a PCM value of 12,539. The interpolation amount to be added to the third table entry is given by (18,204−12,539)*16,640/24,000 or 3928. Therefore, in this example, the PCM code word that would be used is 12,539+3928 or 16,467.

One skilled in the art will appreciate that the manipulations described above in connection with the example lookup table implementation can be carried out without requiring floating point trigonometric evaluations. Accordingly, where delay in audio object conversion is attributable to mathematical (and other) operations with floating point numbers, the impact of removing the need for trigonometric functions to be evaluated by way of floating point mathematical calculations could be a reduction in delay for the conversion process to complete.

It will be understood that in some embodiments the ringtone produced by conversion is polyphonic rather than monotonic. The lookup table implementation in such circumstances could, in some examples, be similar to the example implementation described above, with trigonometric function values associated with musical notes that are played simultaneously with other notes being appropriately added together with the trigonometric function values of the other notes (sum of sinusoids) at each sampling moment where there exists simultaneity. Suitable scaling down of individual trigonometric function values prior to the adding together would ensure that the resultant value is within the valid range for PCM data.

Audio object conversion has been described in the context of ringtones. In some embodiments, audio object conversion is carried out for purposes other than for generating of a ringtone. For example, audio object conversion might be carried out for other types of notification (for example, preset alarm notification) or entertainment purposes, such as music listening.

Certain adaptations and modifications of the described embodiments can be made. Therefore, the above discussed embodiments are considered to be illustrative and not restrictive.

What is claimed is:

1. An electronic communication device for converting a polyphonic note-based audio object to a Pulse Code Modulated (PCM) stream having a plurality of sample points, said polyphonic note-based audio object containing at least two notes which overlap in at least some time interval, comprising:

a memory containing said polyphonic note-based audio object and a lookup table containing trigonometric function evaluations, said polyphonic note-based audio object containing note frequency information for each note;

a conversion module for converting said polyphonic note-based audio object to said Pulse Code Modulated (PCM) stream;

a processor for reading said memory and executing said conversion module, said conversion module including computer executable instructions for generating a PCM value for each sample point based upon each note frequency information and said trigonometric function evaluations;

a phone application for establishing a voice call service over a wireless link, wherein said phone application launches said conversion module on notification of an incoming call request, and wherein said polyphonic note-based audio object comprises a ringtone; and a speaker, including a speaker driver, for receiving said PCM stream and outputting corresponding audio, wherein said computer executable instructions include instructions for selecting an entry from said look-up table based upon each note frequency information, a sampling frequency, and a sample point number, and wherein said instructions for selecting include instructions for determining a step size within the look-up table based upon a ratio between said note frequency information and said sampling frequency.

2. The electronic communications device claimed in claim 1, wherein said instructions include summing each PCM value for each sample point to generate said PCM stream for each sample point.

3. The electronic communications device claimed in claim 1, wherein said instructions includes applying a scaling factor to each PCM value for each sample point.

4. The electronic communications device claimed in claim 1, wherein said device comprises a mobile wireless handheld device.

5. The electronic communications device claimed in claim 1, wherein said polyphonic note-based audio object comprises a ringtone.

6. A method of converting a polyphonic note-based audio object to a (Pulse Code Modulated) PCM stream by an electronic communication device, the electronic communication device having a memory storing a lookup table of trigonometric function evaluations, the memory also storing said polyphonic note-based audio object, said polyphonic note-based audio object containing at least two notes which overlap in at least some time interval, said polyphonic note-based audio object including note frequency information for each note, said PCM stream having a plurality of sample points, said method comprising steps of:
   accessing said polyphonic note-based audio object to extract said note frequency information; and
   generating a PCM value for each sample point based upon said note frequency information and said trigonometric function evaluations,
   wherein said step of generating includes, for each sample point, selecting an entry from said look-up table based upon each note frequency information, a sampling frequency, and a sample point number, and wherein said step of selecting includes a step of determining a step size within the look-up table based upon a ratio between each note frequency information and said sampling frequency.

7. The method claimed in claim 6, further comprising the step of summing each PCM value for each sample point to generate said PCM stream for each sample point.

8. The method claimed in claim 6, further comprising the step of applying a scaling factor to each PCM value for each sample point.

9. The method claimed in claim 6, wherein the step of applying a scaling factor is performed prior to the step of summing.

10. A computer program product comprising a computer readable medium storing computer executable instructions for converting a polyphonic note-based audio object to a (Pulse Code Modulated) PCM stream within an electronic communication device, the computer readable medium storing a lookup table of trigonometric function evaluations and said polyphonic note-based audio object, said polyphonic note-based audio object containing at least two notes which overlap in at least some time interval, said polyphonic note-based audio object including note frequency information for each note, said PCM stream having a plurality of sample points, said computer executable instructions comprising:
   computer code means for accessing said polyphonic note-based audio object to extract each note frequency information; and
   computer code means for generating a PCM value for each sample point based upon each note frequency information and said trigonometric function evaluations,
   wherein said means for generating includes, for each sample point, code means for selecting an entry from said look-up table based upon each note frequency information, a sampling frequency, and a sample point number, and wherein said means for selecting includes code means for determining a step size within the look-up table based upon a ratio between said note frequency information and said sampling frequency.

11. The computer program product claimed in claim 10, wherein said code means include summing each PCM value for each sample point to generate said PCM stream for each sample point.

12. The computer program product claimed in claimed in claim 10, wherein said code means includes applying a scaling factor to each PCM value for each sample point.

13. The computer program product claimed in claim 10, wherein said device further includes a phone application for establishing a voice call service over a wireless link, and wherein said code means for accessing and generating are performed after said phone application receives notification of an incoming call request, and wherein said polyphonic note-based audio object comprises a ringtone.

* * * * *